United States Patent
Pohjanvouri et al.

(10) Patent No.: US 6,567,396 B1
(45) Date of Patent: May 20, 2003

(54) ADAPTIVE THROUGHPUT IN PACKET DATA COMMUNICATION SYSTEMS USING IDLE TIME SLOT SCHEDULING

(75) Inventors: Timo Pohjanvouri, Göteborg (SE); Jan Lindskog, Pixbo (SE); Pär Wenåker, Göteborg (SE); Torbjörn Kärnbo, Göteborg (SE); Håkan Svensson, Vallda (SE); Gunnar Rydnell, Rävlanda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/459,570

(22) Filed: Dec. 13, 1999

(51) Int. Cl.[7] ................................................ H04J 3/24
(52) U.S. Cl. ..................................................... 370/349
(58) Field of Search ............................... 370/342–352, 370/313, 458–463, 522, 412, 421, 445, 389–395, 331–336; 709/243, 217–223; 711/169; 455/575, 426–430, 406–411; 725/28–33, 108, 133, 141

(56) References Cited

U.S. PATENT DOCUMENTS

| | | | |
|---|---|---|---|
| 5,142,533 A | * 8/1992 | Crisler et al. | 370/349 |
| 5,384,777 A | * 1/1995 | Ahmadi et al. | 370/337 |
| 5,420,864 A | 5/1995 | Dahlin et al. | 370/337 |
| 5,430,760 A | 7/1995 | Dent | 370/237 |
| 5,502,721 A | * 3/1996 | Pohjakallio | 370/336 |
| 5,726,984 A | * 3/1998 | Kubler et al. | 370/349 |
| 5,729,541 A | * 3/1998 | Hamalainen et al. | 370/337 |
| 5,784,362 A | * 7/1998 | Turina | 370/321 |
| 5,850,392 A | 12/1998 | Wang et al. | 370/337 |
| 5,910,949 A | 6/1999 | Bilstrom et al. | 370/337 |
| 5,970,062 A | * 10/1999 | Bauchot | 370/508 |
| 5,991,633 A | 11/1999 | Corriveau et al. | 370/337 |
| 6,031,832 A | * 2/2000 | Turina | 370/348 |
| 6,058,106 A | * 5/2000 | Cudak et al. | 370/313 |
| 6,094,426 A | * 7/2000 | Honkasalo et al. | 370/331 |
| 6,201,817 B1 | * 3/2001 | Sullivan | 370/463 |

OTHER PUBLICATIONS

"Digital Cellular Telecommunications System (Phase 2 +); General Packet Radio Service (GPRS); Mobile Station (MS)—Base Station System (BSS) Interface; Radio Link Control/Medium Access Control (RLC/MAC) Protocol (GSM 04.60 Version 6.3.11 Release 1997)", European Standard, Jun. 1999, pp 1–185.

* cited by examiner

Primary Examiner—Kwang Bin Yao
Assistant Examiner—Prenell Jones (57) ABSTRACT

Random access opportunities are provided to packet data devices needing urgent transmit resources. Additionally, random access opportunities are controlled by prioritizing both the random access opportunities and one or more of the packet data device that needs to transmit or the application data that needs to be transmitted.

14 Claims, 4 Drawing Sheets

ADAPTIVE THROUGHPUT IN PACKET DATA COMMUNICATION SYSTEMS USING IDLE TIME SLOT SCHEDULING

BACKGROUND

The present invention relates generally to communication systems and, more particularly, to techniques and structures for the efficient use of packet data communications in radiocommunication systems.

The growth of commercial communication systems and, in particular, the explosive growth of cellular radiotelephone systems worldwide, has compelled system designers to search for ways to increase system capacity and flexibility without reducing communication quality beyond consumer tolerance thresholds. For example, most early cellular communication systems provided services using circuit-switched technologies. Now, however, mobile calls may be routed in a circuit-switched fashion, a packet-switched fashion, or some hybrid thereof. Moreover, it has become increasingly desirable to couple and integrate mobile cellular telephone networks, for instance a GSM network, to Internet protocol (IP) networks for call routing purposes. The routing of voice calls over IP networks is frequently termed "voice over IP" or, more succinctly, VoIP.

Packet-switched technology, which may be connection-oriented (e.g., X.25) or "connectionless" as in IP, does not require the set-up and tear-down of a physical connection, which is a significant difference relative to circuit-switched technology. This feature of packet data typically reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers," are stationed between the communicating end-systems to make decisions about the most appropriate route to take on a per packet basis. Routing decisions are based on a number of characteristics, including, for example: least-cost route or cost metric; capacity of the link; number of packets waiting for transmission; security requirements for the link; and intermediate system (node) operational status.

In packet data communication schemes, access to the system is provided on a random basis using a packet data scheduler disposed in the fixed part of the system. For example, a mobile station carries out a random access within a cellular digital packet data communication system in order to initiate a data transfer session. The random access can be carried out, however, only when the scheduler announces an idle time slot in the downlink. Then the mobile station initiates a transfer (for example by transmitting a BEGIN frame) in the idle time slot. When the cellular digital packet data communication system receives the transfer, it acknowledges receipt of the BEGIN frame to the specific mobile station. This acknowledgment indicates to the mobile station that the communication system had success in decoding the message that was sent over the random channel. If the cellular digital packet data communication system did not receive the initial transfer, due to, for example, a collision of packets received from several mobile stations attempting random access at the same time, then the mobiles will retry random access after waiting for some e.g., random, time period. Included in the Begin message, the mobile proposes a temporary address to be used for the data transaction, and within the successful acknowledgement from the communication system, the communication system explicitly confirms the address. Alternatively, the communication system may explicitly transfer another temporary address that shall be used by the mobile terminal. It will be appreciated by those skilled in the art that different mechanisms for assigning a temporary address can be used.

Once a mobile station has made a successful random access, and is therefore active, it is scheduled by the system to transfer packets on a radio channel. The scheduling of transmission resources by the system for the active mobile station provides the mobile station with a reserved access, as opposed to a random access. The scheduling can be carried out on basis of the mobile's Quality of Service (QoS) or other widely known methods. With the introduction of new services or applications over packet data systems, for example real time (RT) services such as VoIP, there will be a large variety of Quality of Service (QoS) demands on the network. Certain users, for example, those utilizing real time voice applications will have a very high demand for the availability of transmission resources, whereas users, for example, who transmit short messages or electronic mail, will be satisfied with a lower availability of transmission resources.

For example, in a UMTS system, there are four proposed QoS classes: the conversational class; streaming class; interactive class; and background class. The main distinguishing factor between these classes is the sensitivity to delay of the traffic. Conversational class traffic is intended for traffic which is very delay sensitive while background class traffic is the most delay insensitive traffic class. Conversational and streaming classes are intended to be used to carry RT traffic flows and interactive and background classes are intended to be used to carry Internet applications (e.g., WWW, E-mail, Telnet, FTP, etc.).

In considering how to accommodate varying QoS requirements in packet data systems, a problem has arisen in that a mobile station, which has already established a medium access control (MAC) transaction with the system may suddenly need to send additional, high priority (i.e., hard time constraint) packets. Such information could, for example, be control information blocks or high QoS payload blocks that need to be transferred to the system rather rapidly, which time constraints may not be achievable using the existing MAC transaction, i.e., by waiting for the mobile station's next reserved access. For example, the mobile station may be involved in a data transaction, e.g., accessing a web page over the Internet, and need to establish a voice connection at the same time.

Given the limited resources available in radiocommunication systems, the existing MAC transaction may not be able to service the new voice connection sufficiently rapidly to avoid unacceptable delay in transmitting voice information, which information is well known to be rather delay sensitive. For example, the packet scheduler in the system may not schedule a next reserved access for the mobile station's data connection sufficiently rapidly to service the new voice connection. This problem is exacerbated by the fact that packet data implementations in radiocommunication systems typically only assign temporary packet data (MAC) addresses to mobiles after they make a successful random access request. Since packet data implementations in radiocommunication systems are address limited as compared with, for example, packet data implementations in wireless LAN systems, i.e., the number of available addresses in the MAC transport channel does not permit all users in a cell to be assigned a MAC address, these systems employ temporary MAC addresses which result in the scheduler typically reserving sufficient resources for a mobile station to transmit a limited amount of data, e.g., 50 bytes. For systems utilizing temporary MAC addresses assigned to currently active users, the overall performance may be damaged if unlimited access is given to the random access occasions, since the delay over the random access channel will increase based on the number of accesses made from the mobile users due to an increased number of collisions.

Accordingly, it would be desirable to provide systems and methods for providing enhanced mechanisms to more rapidly service mobile stations' need to send data packets having hard time constraints and, in particular, for servicing those mobile stations that have existing packet data transactions. Moreover, it would be desirable to provide a more flexible packet data system which addresses the complex problem of having many mobile stations operating in a cell at the same time, each potentially running different applications having different QoS requirements and at the same time solving the problem of the limited bandwidth available for overhead communication and resource scheduling on the random access channel.

SUMMARY

The present invention overcomes the above-identified deficiencies in the art by providing a method and system for packet data communications which permits flexible usage of both random access and reserved access opportunities for packet data transmission. According to exemplary embodiments of the present invention, a mobile station can use a random access opportunity to transmit a data packet even if it already has an existing data connection for which it is awaiting a reserved access opportunity. For example, if a mobile station has an existing data connection and that mobile station's user initiates a voice connection, then the mobile station may use either a reserved access time slot or a random access time slot (whichever occurs first) to transmit the voice data packet. In this way, the present invention provides more rapid servicing of data packets having hard time constraints.

According to another exemplary embodiment of the present invention, the different random access opportunities may be assigned a priority such that a mobile station that wants to use a random access opportunity to transmit data can only use the random access opportunity if it has a priority level that is the same as, or higher than, that of the random access opportunity. For example, if random access opportunities are assigned one of two priority levels (high and low) and if a mobile station has a low priority level, then it can only use a random access opportunity having a low priority level. The priority level of a random access opportunity according to this exemplary embodiment can be indicated by assigning a first address to high priority random access opportunities and a second address to low priority random access opportunities. Then, the system can transmit either the first or second address indicating which type of random access opportunity is valid for the next uplink time slot. Of course, more than two priority levels may be implemented.

As an alternative to the foregoing, mobile stations can identify random access opportunities as having a particular priority level, without the access level being explicitly signaled by the system. For example, according to another exemplary embodiment of the present invention, a mobile station that is waiting for a next reserved access opportunity may receive an indication that a first random access opportunity is available. If the mobile station is, for example, a high priority mobile station, then it may use the first random access opportunity to transmit data. Otherwise, if it is a low priority mobile station, it continues to wait for its assigned reserved access opportunity. If, however, a second random access opportunity is signaled by the system then the low priority mobile station can use this second random access opportunity to transmit data. This technique can also be applied when the mobile station is making the initial random access, i.e., it has not received an address and is not waiting for its reserved access.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. For example, the present invention can be applied to any packet data system, e.g., those defined for IS-136 compliant systems (e.g., Mango or EDGE implementations) or GSM compliant packet data systems, also known as GPRS systems.

Figure 1:
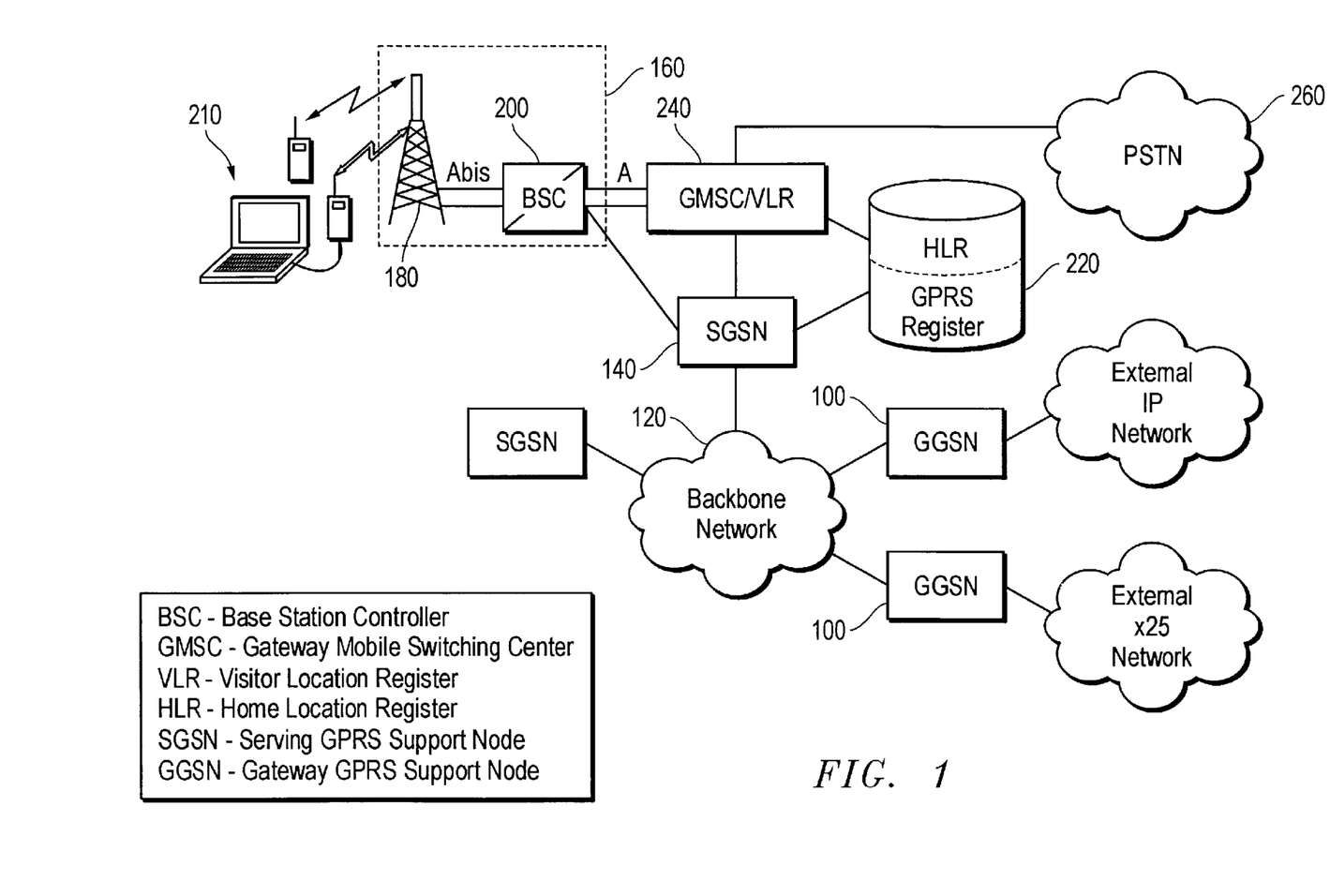
FIG. 1 illustrates an exemplary packet data communication system in which the present invention can be implemented.

An overview of an exemplary GPRS network architecture is illustrated in FIG. 1. Information packets from external networks, e.g., the Internet, will enter the GPRS network at a GGSN (Gateway GPRS Service Node) 100. The packet is then routed from the GGSN via a backbone network, 120, to a SGSN (Serving GPRS Support Node) 140, that is serving the area in which the addressed GPRS mobile resides. From the SGSN 140 the packets are routed to the correct BSS (Base Station System) 160, in a dedicated GPRS transmission. The BSS includes a plurality of base transceiver stations (BTS), only one of which, BTS 180, is shown and a base station controller (BSC) 200. The interface between the BTSs and the BSCs is referred to as the A-bis interface. The BSC is a GSM specific denotation and for other exemplary systems the term Radio Network Control (RNC) is used for a node having similar functionality as that of a BSC. Packets are then transmitted by the BTS 180 over the air interface to a remote unit 210 using a selected information transmission rate.

A GPRS register will hold all GPRS subscription data. The GPRS register may, or may not, be integrated with the HLR (Home Location Register) 220 of the GSM system. Subscriber data may be interchanged between the SGSN and the MSC/VLR 240 to ensure service interaction, such as restricted roaming. The access network interface between the BSC 200 and MSC/VLR 240 is a standard interface known as the A-interface, which is based on the Mobile Application Part of CCITT Signaling System No. 7. The MSC/VLR 240 also provides access to the land-line system via PSTN 260.

Figure 2:
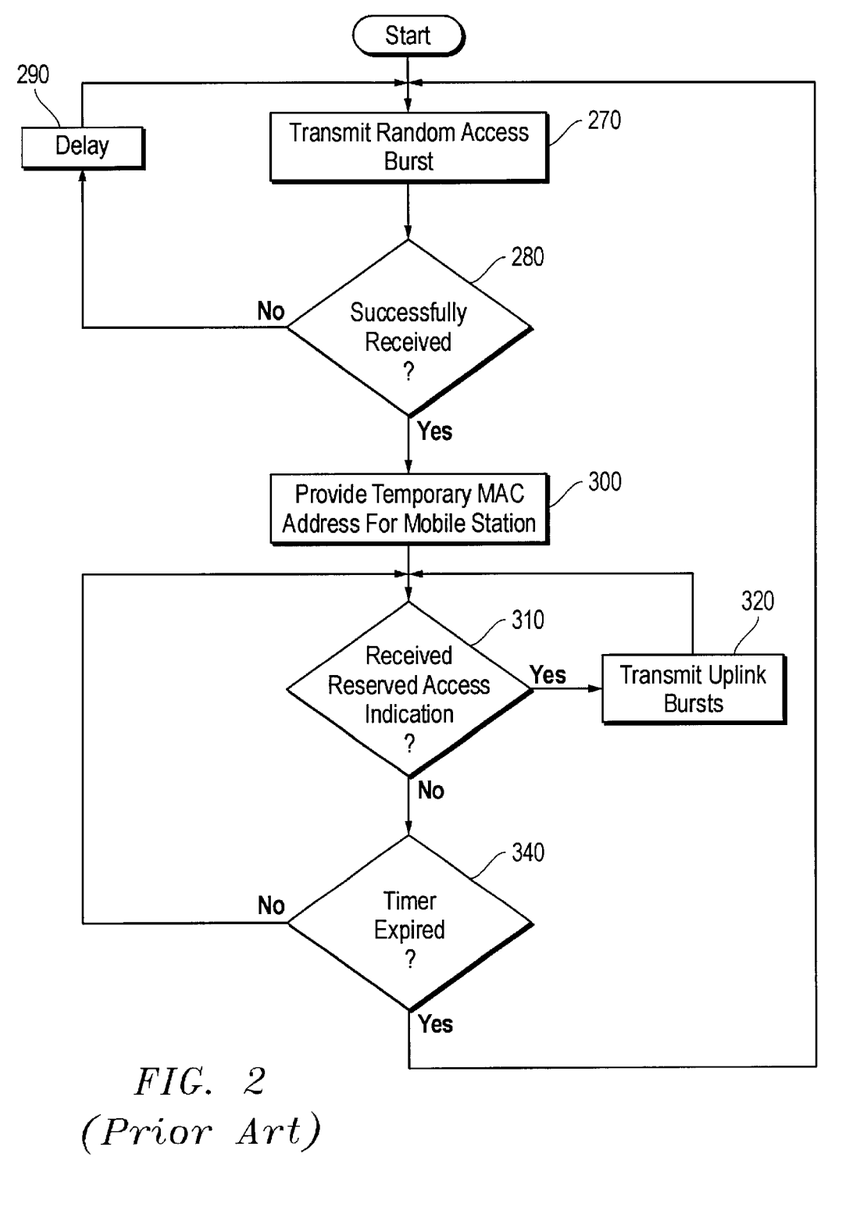
FIG. 2 is a flowchart depicting a conventional method for packet data communication in a radiocommunication system.

FIG. 2 is a flowchart depicting a conventional method for accessing and transmitting packet data in a radiocommunication system based on the Mango specification. As mentioned above, a typical scenario involving packet data transmissions by a mobile station starts with a random access to the system at step 270. For example, in a Mango system, a mobile station initiates a random access to validate a proposed temporary MAC address by sending a Begin frame to the system on the random access channel, i.e., when the system indicates that a timeslot is available for random access. Those skilled in the art will appreciate that since random access is performed on a contention basis, any given mobile station may not succeed on any given random access attempt due to "collisions" between the random access attempts of multiple mobile stations, which collisions prevent the base station from successfully receiving the random access burst. If the random access is not successfully received, at decision block 280, then the mobile station will wait for some period of time (block 290), e.g., a random time period, prior to attempting random access again at the next signaled opportunity.

Upon successful reception at the base station, the system either confirms the proposed temporary MAC address or assigns a new temporary MAC address at step 300. The temporary MAC address may have a limited or unlimited lifetime. If limited, the mobile station will be allocated the number of bytes that it requested in the Begin frame and the temporary MAC address will be used during the transaction of that amount of data. If unlimited, then the mobile station will inform the system when its pending user data has decreased below a threshold, which will be designated by the system, in which case the temporary MAC address will be released for usage by other mobile stations. Having been assigned an address, the mobile station will then wait to receive an indication from the system that it is being given a reserved access opportunity, e.g., by decoding its own address as the address that is valid for the next reserved uplink transmission. When a reserved access opportunity for this mobile station is detected, at step 310, the mobile station will transmit one or more uplink bursts of packet data at step 320. Then, the mobile will return to step 310 to await receipt of its next reserved access opportunity. An exception timer is used to release the temporary MAC address. When a predetermined time period has expired (step 340) during which the mobile station has not received a reserved access opportunity, e.g., because the mobile station has already transmitted its requested amount of data, the process will end and the mobile station will need to randomly access the system again to transmit more data.

As mentioned above, however, conventional packet data communication techniques do not provide an adequate way to handle a sudden need to transmit urgent information, e.g., control information indicating that a data transaction should be suspended in favor of a voice connection. Although the exception timer(s) do provide a way to make sure that a mobile station eventually has an opportunity to transmit data after it has received a temporary MAC address, such a timer does not provide sufficiently rapid transmission opportunities under all circumstances. According to a first exemplary embodiment of the present invention, illustrated in FIG. 3, this problem is overcome by permitting a mobile station to access the random access channel whenever necessary to transmit certain types of information, e.g., hard time constraint control packets.

Figure 3:
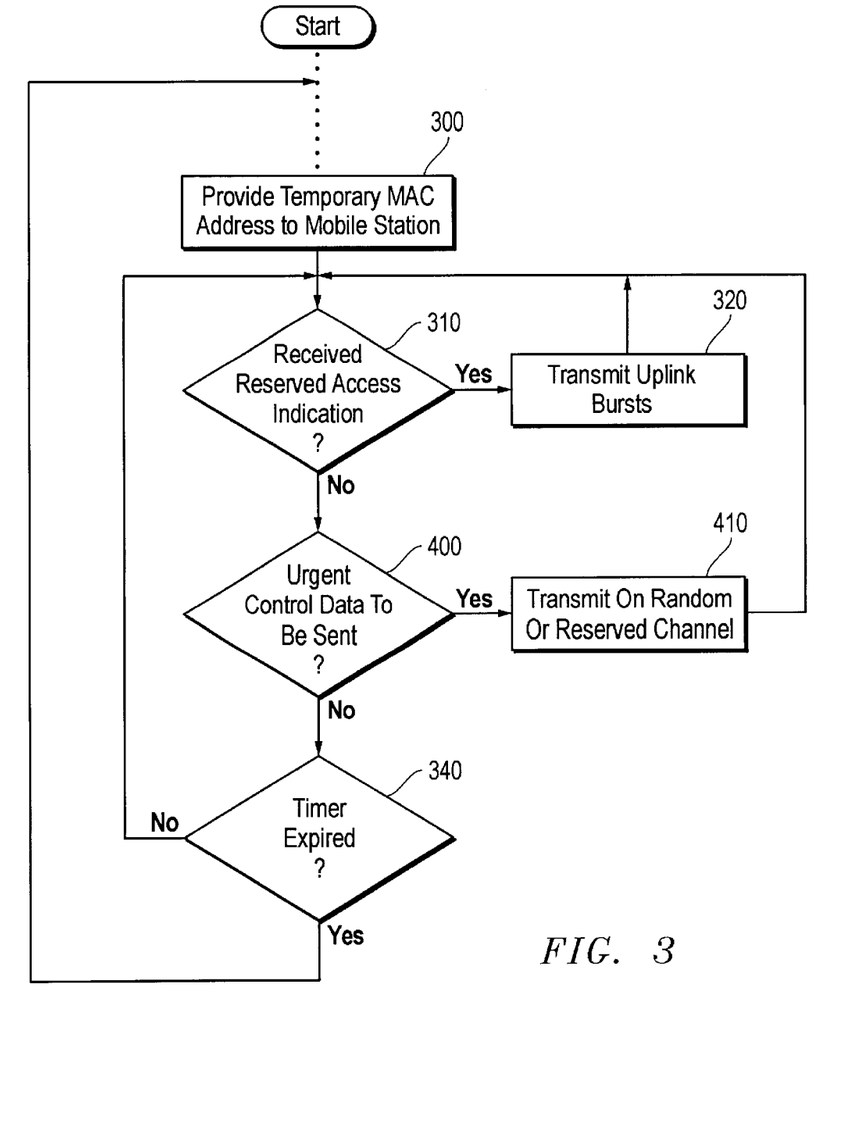
FIG. 3 is a flowchart illustrating a first exemplary embodiment of the present invention.

Therein, blocks which refer to steps described above with respect to FIG. 2 have the same reference numerals. Moreover, the initial portion of the method of FIG. 2 is omitted to reduce the size of the flowchart in FIG. 3, however those skilled in the art will appreciate that the dotted line at the top of the flowchart of FIG. 3 is intended to represent inclusion of steps 270, 280 and 290 therein. Once again, at step 300 the mobile station receives a temporary MAC address. When a reserved access opportunity for this mobile station is identified at step 310, the mobile station will transmit one or more uplink bursts at step 320 and return to wait for another reserved access opportunity. However, unlike the method of FIG. 2, methods according to the present invention have at least two criteria under which a mobile station that has been assigned a temporary MAC address may use the random access channel while the temporary MAC address is still assigned to that mobile station. First, as in the conventional method, the exceptions timer may time out at step 340, in which case the mobile station returns to block 270 to initiate another random access when the mobile station has data to transfer. Second, unlike the conventional method, the mobile station may generate a particular type of urgent data to transmit, as determined at step 400, which the mobile station will then be permitted to transmit on the next available opportunity (either its reserved access or on the random access channel) that urgent data (step 410). The particular criteria used in the mobile station to identify such urgent data may vary either by type of data (e.g., control data as opposed to payload data), time constraint (e.g., an acceptable packet delay threshold), both or some other criteria.

Thus, according to this first exemplary embodiment of the present invention, a mobile station which needs to suspend a data transaction because its user wishes to initiate a voice connection need not wait for its next reserved access opportunity to transmit a control message suspending the data transaction. Instead, the mobile station will be able to use either the next reserved access opportunity or the next random access opportunity (e.g., idle time slot), whichever occurs first, to send the control message suspending the data transaction. In this way, the voice connection can be established without undue delay.

As QoS parameters become more important in radiocommunication systems due to both an ability and desire to provide different levels of service to subscribers, it will also be desirable to control the usage of the random access for transmitting control information as described above. According to another exemplary embodiment of the present invention, the usage of random access opportunities to transmit urgent data may be prioritized such that a mobile station that wants to use a random access opportunity to transmit such data can only use the random access opportunity if it has a priority level that is the same as, or higher than, that of the random access opportunity. For example, if random access opportunities are assigned one of two priority levels (e.g., priority and low-end) and if a mobile station has a low-end level, then it can only use a random access opportunity having a low-end level. Another reason for dividing users of the random access channel into smaller groups by providing different priority levels is to minimize the collision probability in highly congested traffic situations.

Figure 4:
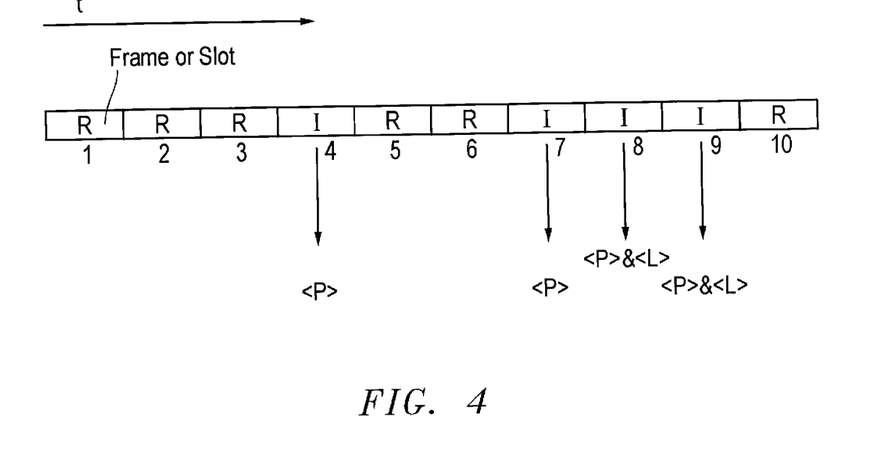
FIG. 4 illustrates prioritization of uplink resources for random access according to exemplary embodiments of the present invention.

This concept according to the present invention is illustrated in FIG. 4, which depicts a series of uplink frames or timeslots. Therein, the first three frames or timeslots are allocated for reserved access by one or more addressed mobile stations. The fourth frame or timeslot provides a random access opportunity, but only for a priority mobile station. The fifth and sixth frames or timeslots are reserved, however the seventh frame or timeslot provides a random access opportunity for priority mobile stations. The eighth frame or timeslot, on the other hand, is a random access opportunity which can be used by either priority or low-end mobile stations, as is the ninth frame or timeslot. The tenth frame or timeslot is reserved.

Alternatively, or in addition thereto, the prioritization of random access channels can be used to selectively permit transmission of urgent data for particular applications rather than particular mobile stations. For example, a mobile station may run applications which generate high priority control data (e.g., to suspend a data transaction in favor of a voice transaction), low priority control data (e.g., to suspend a first data transaction in favor of a second data transaction) and control data associated with mobile station operation (e.g., measurement reports used to determine when a handoff is desirable). The mobile station may, for example, be permitted to use any one of frames or timeslots 4, 7, 8 and 9 in FIG. 4 to transmit the high priority control data or the mobile station operation control data, but may only be permitted to use frames or timeslots 8 and 9 to transmit the low priority control data.

The priority level of a random access opportunity according to these exemplary embodiments can be indicated explicitly by the system by, for example, assigning a first address to priority random access opportunities and a second address to low-end random access opportunities. Then, the system can transmit the address in the downlink MAC protocol data unit indicating which type of random access opportunity is being provided in the uplink. Of course, more than two priority levels may be implemented for any of the embodiments described herein.

The usage of multiple addresses to explicitly indicate a priority level of a random access opportunity does, however, reduce the number of addresses available for assignment as temporary MAC addresses to mobile stations. Thus, according to another exemplary embodiment of the present invention, it may be preferable to provide priority levels implicitly rather than using explicit addressing, e.g., by using a state machine within the mobile station to identify a random access opportunity as either a priority or a low-end random access opportunity. More specifically, the mobile station can use pattern recognition to identify a particular random access opportunity as having a particular priority level. By monitoring the uplink addressing transmitted by the system on the downlink, the mobile station can store information regarding previous transmit opportunities to create a pattern. This pattern can then be used by the mobile station to independently determine a priority of a next random access opportunity signaled by the system.

Figure 5:
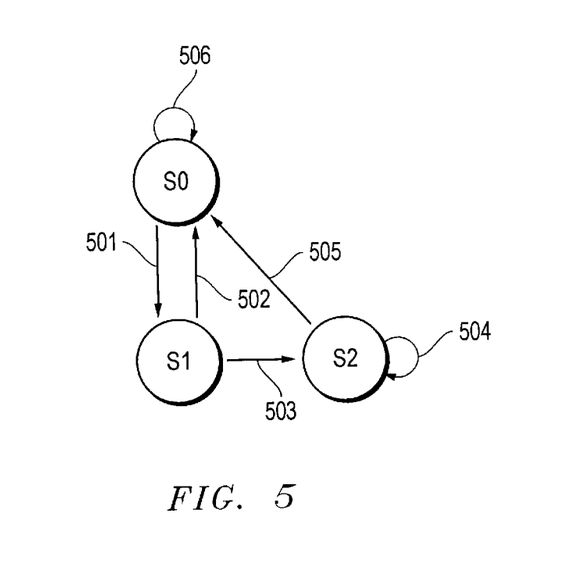
FIG. 5 depicts a state machine according to an exemplary embodiment of the present invention wherein a remote station can implicitly identify a priority level of a random access opportunity.

An exemplary state machine for random access channels having two priority levels is illustrated in FIG. 5. However, unlike the previous exemplary embodiment in which two priority levels were created by using two different addresses signaled on the downlink, in this exemplary embodiment only one address is reserved and used for signaling a random access opportunity. This state machine can be used by a mobile station to determine whether it can use the random access channel to transmit urgent control data. State S0 is the default state which the mobile station enters while it is waiting to make a random access or after it has made an initial random access and has been assigned a temporary MAC address. Thus, while in state S0, the mobile station is waiting to receive either a random access opportunity or a reserved access opportunity. A transition 501 is made from state S0 to state S1 when the mobile station detects a random access opportunity, i.e., when it decodes a downlink address indicating that the next uplink transmit opportunity is a random access opportunity.

However, state S1 represents a random access opportunity for priority transmissions only. Thus, depending upon whether priority is assigned at a mobile station level or an application level, the mobile station will only be able to use a random access opportunity when in state S1 if the control data to be transmitted has the highest priority level. For example, if priority is assigned on a per mobile station (or subscriber) basis, then the mobile station in state S1 will only be able to send its urgent control data in a random access opportunity if it has priority status. Otherwise, it will have to wait until it reaches state S2 as described below. Alternatively, if priority is assigned on a per application basis, then the mobile station in state S1 will only be able to send its urgent control data in a random access opportunity if the application that has generated the control data has priority status. If a mobile station detects a reserved access opportunity for any particular mobile station while in state S1, then the mobile station transitions (502) back to state S0.

If the mobile station is not able to transmit its urgent control data while in state S1, and if it does not detect a reserved access opportunity in the meantime, then the mobile station will transition (503) to state S2 when the system indicates that another random access opportunity is available. In this exemplary embodiment, a transition to state S2 occurs after the second random access opportunity is signaled from the time at which the mobile station needed to transmit urgent control data. However, those skilled in the art will appreciate that the number of random access opportunities which must occur prior to transitioning between states S1 and S2 (or other states if more priority levels are provided) can vary. For example, the condition for transitioning between states S1 and S2 could be set to two or three additional random access opportunities if it was desirable to provide more bandwidth to priority mobiles (or to priority application data). Moreover, other criteria could be used in addition to the number of random access opportunities (or as an alternative thereto) to trigger transitioning between states. For example, if a mobile station keeps track of a maximum packet delay which is acceptable for transmitting a control data packet that is stored in its transmit buffer, then as the buffer time of that packet approaches the maximum desired packet delay associated with that data packet, the mobile station may transition to the next state to permit it a greater opportunity to use the random access channel to transmit the urgent control data.

Once in state S2, a low-end mobile station can use a random access channel to transmit its control data (or, alternatively, a low-end application can transmit its control data). The mobile station will stay in state S2 (504) until it detects a reserved access opportunity for any particular mobile station, at which time the mobile station will transition (505) back to state S0. While in state S0, the mobile station stays in that state (506) when it detects yet another such reserved access opportunity.

It will be appreciated that the foregoing exemplary embodiments can be combined to provide other techniques for controlling access to the random access channel(s). For example, two addresses can be allocated for random access and a separate state machine can be provided in each mobile station for each address. Thus two random access channels could be provided via explicit signaling, each of which can be further prioritized into two or more priority levels using the state machine concept described above. Other combinations and modifications will also be apparent to those skilled in the art.

Moreover, certain of the foregoing exemplary embodiments can be applied to the control of the initial random access made by a mobile station, as well as use of the random access channel while waiting for a reserved access opportunity. For example, exemplary embodiments in which application data is prioritized for transmission can be matched with different levels of random access channel priority to determine whether a remote station can use a particular random access opportunity. Likewise, implicit identification of random access opportunity priority by a mobile station can be implemented for initial usage of the random access channel as well as usage of the random access channel while waiting for a reserved access opportunity.

The foregoing has described the principles, exemplary embodiments and modes of operation of the present invention. However, the invention should not be construed as being limited to the particular embodiments discussed above. While the above-described embodiments were provided using TDMA, one skilled in the art will appreciate that the present invention may be practiced in any of a number of different protocols such as CDMA, FDMA, TDD, etc. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for transmitting packets between a remote station and a communication system comprising the steps of:
   assigning an address to said remote station;
   waiting, by said remote station, for a reserved access opportunity associated with said address to transmit payload data;
   receiving, at said remote station, predetermined control data for transmission wherein said predetermined control data is control data with a threshold latency period; and
   permitting said remote station to transmit said predetermined control data on a random access opportunity while the remote station is waiting for the reserved access opportunity.

2. The method of claim 1, wherein said step of waiting further comprises the steps of:
   starting a timer; and
   permitting said remote station to use said random access opportunity to transmit said payload data only after said timer expires.

3. The method of claim 1, wherein said address is a temporary medium access control (MAC) layer address.

4. The method of claim 1, wherein said predetermined control data is a message to suspend a data transaction associated with said address.

5. The method of claim 1, further comprising the step of:
   transmitting, by said communication system, at least two different types of random access opportunities, wherein one of said at least two different random access opportunities has a higher priority level than the other of said at least two different random access opportunities.

6. The method of claim 5, wherein said at least two different random access opportunities are distinguished by at least two different addresses transmitted by said system.

7. The method of claim 5, wherein said at least two different random access opportunities are assigned a same address code by said system.

8. The method of claim 7, further comprising the step of:
   determining a priority level of a random access opportunity using a state machine.

9. The method of claim 5, wherein said step of permitting further comprises the step of:
   selectively permitting said mobile station to access said random access opportunity based upon a priority level associated with said mobile station and a priority level of said random access opportunity.

10. A method for a remote station to randomly access a packet data radiocommunication system comprising the steps of:
    providing at least two different random access channels;
    assigning a different address to each of said at least two different random access channels, wherein each of said different random access channels has a different priority level;
    transmitting, in a downlink, one of said different addresses to identify a random access opportunity associated with one of said at least two random access channels; and
    selectively transmitting, on an uplink, an access burst by said remote station based on a comparison between a priority level associated with said one of said different addresses transmitted on said downlink and a priority level of an application generating data for transmission at said remote station.

11. A method for a remote station to randomly access a packet data radiocommunication system comprising the steps of:
    transmitting, on a downlink, an indicator of a random access opportunity;
    determining, in said remote station, a priority level of said random access opportunity based on a stored pattern of transmissions by said radiocommunication system; and
    selectively transmitting, on an uplink, an access burst by said remote station based on a comparison between said determined priority level of said random access opportunity and a priority level of associated with one of said remote station and an application running on said remote station.

12. The method of claim 11, wherein said step of determining further comprises:
    providing a state machine in said remote station having a state associated with each different priority level; and
    transitioning from one state to the next state after a predetermined number of random access opportunities are identified by said remote station.

13. The method of claim 12, wherein said step of selectively transmitting further comprises the step of:
    transmitting said access burst when said remote station is in a state having a priority level corresponding to a priority level associated with one of said remote station and an application running on said remote station.

14. A method for transmitting packets between a remote station and a communication system comprising the steps of:
    transmitting, by the remote station, a burst on a random access channel;
    providing, by the communication system, a temporary address to said remote station if the burst is successfully received by the communication system;

waiting, by the remote station, for a reserved access opportunity associated with the address to transmit payload data; and transmitting, by the remote station predetermined control data on a random access opportunity while waiting for the reserved access opportunity wherein said predetermined control data is control data with a threshold latency period.

* * * * *